United States Patent

[11] 3,618,884

| [72] | Inventor | Herbert W. Wilson<br>Cypress, Calif. |
|---|---|---|
| [21] | Appl. No. | 7,516 |
| [22] | Filed | Feb. 2, 1970 |
| [45] | Patented | Nov. 9, 1971 |
| [73] | Assignee | McDonnell Douglas Corporation |

[54] RETRACTABLE TIEDOWN POST FOR SERVICE CART
4 Claims, 7 Drawing Figs.

| [52] | U.S. Cl. | 248/361, 105/366 C |
|---|---|---|
| [51] | Int. Cl. | B65j 1/22 |
| [50] | Field of Search | 248/361, 408, 423; 105/366 C; 244/118; 287/119 |

[56] References Cited
UNITED STATES PATENTS

| 849,952 | 4/1907 | Willis | 287/119 R X |
|---|---|---|---|
| 2,729,417 | 1/1956 | Maynard | 248/361 |
| 3,172,371 | 3/1965 | Gutridge | 248/361 X |
| 3,264,656 | 8/1966 | Clay | 248/361 X |
| 3,365,162 | 1/1968 | Davis | 248/361 |

Primary Examiner—Chancellor E. Harris
Attorneys—Walter J. Jason, Donald L. Royer and Robert O. Richardson ABSTRACT: A foot-operated, floor-mounted, self-contained retractable post to restrain a serving cart in an aircraft in areas where a fixed post protruding above the floor would present a hazard. A spring-loaded flush-mounted post is extendible upon partial rotation and is locked flush with the floor upon depression when not in use.

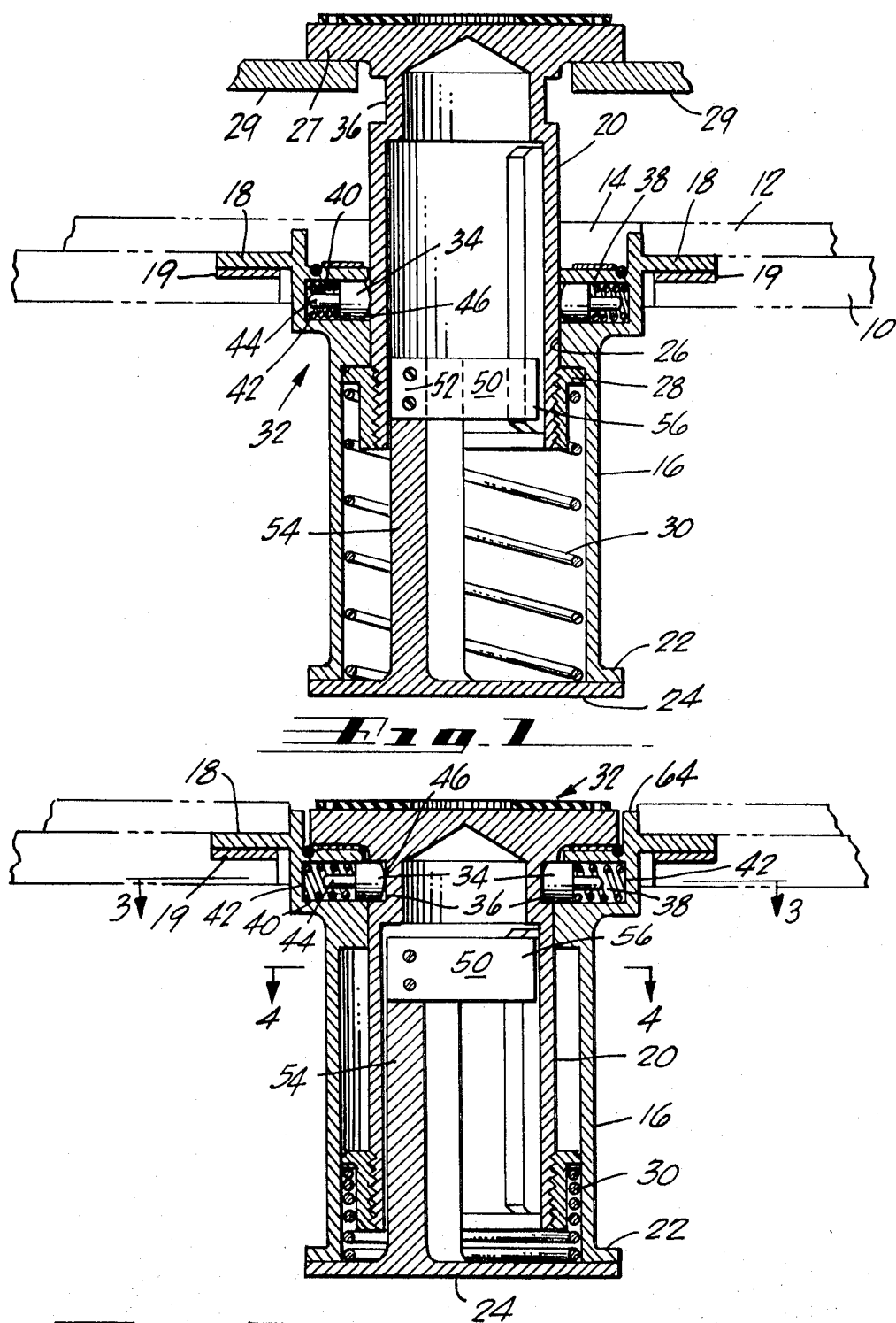

INVENTOR.
HERBERT W. WILSON
BY Robert O. Richardson
—ATTORNEY—

RETRACTABLE TIEDOWN POST FOR SERVICE CART

BACKGROUND OF THE INVENTION

Many existing passenger carrying aircraft use serving carts to deliver food, drink and other necessities to the passengers. The serving carts are also used as service carts to return food, serving items and other used or soiled articles to the galleys. The serving carts are pushed by stewards or stewardesses up and down the aisles in the aircraft. The serving carts have hand-operated wheel brakes, but their weight, which is in excess of 200 pounds, high center of gravity, and narrow width provide a serious passenger damage potential should the aircraft deviate from a smooth level flight, or the cart be jostled aside by a passenger or airline personnel.

Fixed posts extend above the floor in certain nonpassenger areas. These service carts may be attached to them, as needed. However, fixed posts above the floor in the passenger compartments and aisles, when not in use, present a hazard to passengers and airline personnel. Hence, a retractable flush-mounted post is desirable in those areas.

SUMMARY OF THE INVENTION

This invention relates to a restraint (or tiedown post) for a serving cart in an airplane to eliminate a hazard to passengers from a cart moving or tipping. The restraint post is flush with the airplane carpet when not in use, but can be extended to a use position from its retracted position by rotating the post with the foot or other means. This unlocks the post, which is spring loaded, and permits it to move upwardly to its use position. Rotating the post with the foot provides a convenient means for elevating the post to a level where it can engage the retaining device of the serving cart. The post must retract flush with the carpet when not in use. Pushing down on the extended post retracts it flush with the carpet where it is retained by a latching means. These cart restraints are installed in all aircraft areas where serving carts are required and which are used also for passenger egress or ingress.

The tiedown post consists basically of a retractable spring-loaded post within a housing. The housing is rigidly mounted in the aircraft floor so that the surface of the post will be flush with the carpet when the post is in the retracted position. The spring-loaded post is adapted to be locked in a position flush with the floor carpet, but which is extendible to a height above the floor sufficient to be clamped by a serving cart that may be positioned thereover.

The restraint post is unlocked from the retracted position by rotating the upper surface by the foot of the stewardess through an angle sufficient to prevent inadvertent operation. By rotating the post, spring-biased retaining pins mounted in the housing are disengaged from cavities in the post and the post will be extended upwardly by the force of a compression spring. This compression spring is mounted circuitory around the post in the housing, and supported by the base of the housing, and restrained by a cup-shaped retainer threaded onto the post. Upon removal of the unlocking force (i.e., stewardess' foot) from the post, it will return to its original clockwise position by the force of a torsion spring fastened to an inner base post attached to the circular base for the housing. One end of the torsion spring opposite that which is fastened to the inner post is retained between two guides fastened to the outer post and this end of the spring slides between the guides as the post retracts or extends. The guides retain the torsion spring when the post is rotated, thereby applying a torquing force to the torsion spring. Pushing down with the foot or other means on the extended post retracts it into the floor and locks it in place flush with the carpet by the engagement of the spring-biased retaining pins with the cavities in the post. The top of the post has a friction surface to permit easy rotation by the stewardess. Plastic washers with low surface tension are used wherever two surfaces are rotated one with the other to permit smooth easy operation with the least friction. A seal is provided to prevent dirt or moisture from reducing the efficiency of the normal operation of the restraint.

For such a device to be practical for aircraft use, it must be lightweight and yet sufficiently strong to withstand heavy loading applied from the serving cart and its contents from an emergency condition and transfer that load into the airplane structure. The device must not present a hazard to a passenger walking up the aisle and therefore the device must retract into a housing in the floor. It must be easily extended and retracted, endure long term repeated action, be easily installed, removed or replaced. It must be sealed against dirt and spilled liquids, and operate smoothly under all conditions, and lastly, it must have an acceptable appearance as it is part of the aircraft interior.

These and other objects and features of the invention will be more readily understood and appreciated from the following detailed description of the preferred embodiment thereof selected for purposes of illustration and shown in the accompanying drawings, in which:

FIG. 1 is a sectional view in elevation illustrating the post in the extended or use position;

FIG. 2 is a sectional view in elevation illustrating the post in the retracted or stored position;

Figure 3:
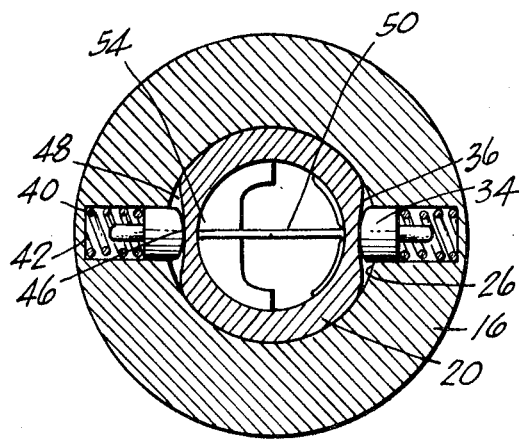
FIG. 3 is a horizontal sectional view taken through plane 3—3 in FIG. 2.

Reference is now made to the sectional view in FIG. 1 wherein a floor panel 10 and carpet 12 are shown in phantom lines to show their relative position to the structure of the present invention. Mounted through an opening 14 in the carpet and floor is a post housing 16 having a collar 18 with which it may be mounted to the floor. Suitable bolts, not shown, may connect the collar 18 with the floor 10 in an appropriate manner. Shims 19 may be used for spacing as their need becomes apparent. Housing 16 extends downwardly from collar 18 and is of such length to contain the vertically extendible post 20 when retracted therein. Housing 16 has an outwardly directed flange 22 at the bottom thereof for the appropriate fastening of a base 24, such as by screws, not shown, or welding or other suitable fastening means. At the top of housing 16 is a cylindrical opening 26, through which cylindrical post 20 may be extended upwardly as shown in FIG. 1 or be retracted downwardly as shown in FIG. 2. The top 27 of the post 20 is enlarged to engage a retaining device 29 on the underside of the cart. This structure 29 locks the cart to the post and prevents vertical or horizontal movement of the cart. Threadedly mounted around the bottom of post 20 (to facilitate its assembly) is an annular collar 28 having a periphery larger than the diameter of the cylindrical opening 26 to thereby limit the extended upward movement of the post 20. The periphery of this collar also bears against the inner surface of the wall of housing 16 to resist lateral forces on the post. A bias means such as a compression spring 30 is placed between the base 24 and this annular collar 28 to bias the position of the post 20 in its extended or use position, as shown in FIG. 1.

Provision is made for locking the post in its retracted, or stored, position, as shown in FIG. 2. A latching mechanism 32 serves this purpose after the post 20 has been depressed downwardly to this stored position. While several such mechanisms may be used, one on each side of the post has been found to be quite satisfactory. Each mechanism includes a spring biased retaining pin 34, cooperatively engageable with a cavity 36 in the outer surface of the walls of post 20. Pin 34 is adapted to translate radially within inwardly directed receptacle 38. This receptacle has an opening in communication with the cylindrical post 20 which moves vertically across its face. A compression spring 40 seats against the bottom 42 of the receptacle 38 and urges the retaining pin 34 inwardly against the outer wall of post 20. Pin 34 has a stop member 44 which abuts against bottom 42 when retaining pin 34 abuts against the outer wall of post 20. Pin 34 has an arcuate abutting surface 46 to prevent jamming or scoring of the post walls during the vertical movement of the post. When post 20 is retracted downwardly to its stored position, as shown in FIG. 2, cavity 36 receives the retaining pin 34 and thus the post 20 is restrained from moving upwardly under the influence of compression spring 30.

The removal of retaining pin 34 from the cavity 36 to permit the upward movement of the post can best be understood with reference to FIG. 3. Here can be seen in plan view the collar 18 by which the housing 16 is mounted below and to the aircraft floor. Within the cylindrical opening 26 of the housing 16 is the post 20 which is adapted to rotate, as well as move vertically. Cavity 36 of the post 20 has a camming surface 48 which, when the post is in stored position as shown in FIG. 2, cooperates with the arcuate abutting surface 46 of pin 34 so that upon rotation of post 20, the retaining pin 34 is moved outwardly from the cavity 36. When this occurs, post 20 is unlatched and the compression spring 30 moves post 20 upwardly to its use position. It can thus be seen that the rotational position of the cavities 36 of post 20 relative to the latching pins 34 determines whether the post 20 remains latched in its retracted, or stored, position or becomes unlocked and moves upwardly to its extended position of use.

Figure 4:
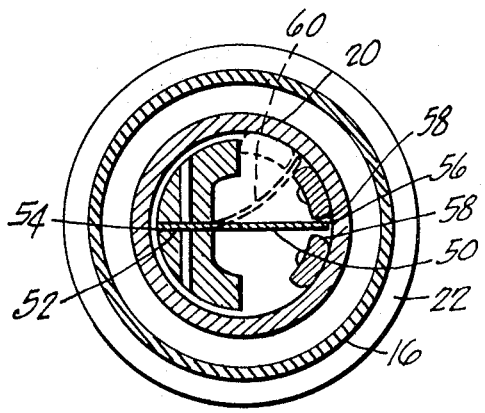
FIG. 4 is a horizontal sectional view taken through plane 4—4 in FIG. 2.

As previously stated, the rotation of the post 20 when its retracted position will cause it to become unlatched. This rotation may be done by the operator's foot. However, a feature of this post is that in the absence of such outside influence, the post will have a rotationally stable position in which the cavities 36 are always in vertical alignment with the latching pins 34 and that a simple downward depression of the post will cause the post to become latched in the stored position by the movement of the locking pins into the cavities. A rotational positioning spring 50 is used for this purpose. This spring 50 will permit the operator to rotate the post, but once the operator's foot has been removed, the spring 50 will rotate the post back to its proper rotational position again. As can be seen in FIGS. 1, 2 and 4, this spring 50 is a torsional leaf spring, having an end 52 secured to a post 54, which is affixed to base 34, and a free end 56 which fits within a groove formed between vertical walls 58 along the inner walls of the post 20. This groove thus provides a guideway for the end 56 of the spring 50 as the post 20 moves vertically, In this manner, the rotational positioning of post 20 by spring 50 is effective to align cavities 36 vertically with retaining pins 34 in both the extended and the retracted positions of the post.

In FIG. 4, spring 50 is also shown in its dashed line position 60 which would be its position when the post 20 has been rotated counterclockwise to its unlatching position. The force of the torque spring 50 then returns the post 20 to its rotational aligned position again when the operator's foot is removed.

Figure 5:
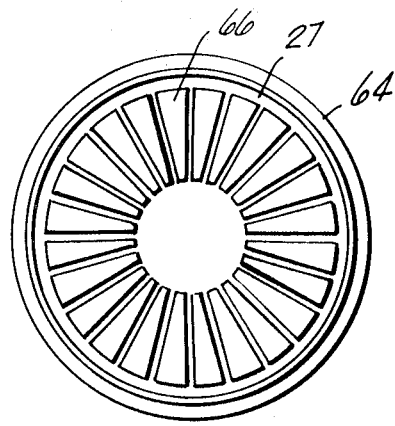
FIG. 5 is a top view.

In FIG. 5 there is shown a plan view of the top 27 of the post 20. It is circular in shape and rotates within the collar 64 of the housing 16 and fits flush with the floor, as shown in FIG. 2. A plurality of raised pie-shaped segments 66 preferably of rubber composition provide frictional contact with an operator's foot to cause rotation of the post when desired. The degree of rotation required to free the retaining pins 34 from the cavities 36 (shown in FIGS. 1 and 2) depends upon the circumferential length of the cavities. It has been found that an arc of 45° prevents inadvertent operation yet permits the operator to extend the post quite conveniently when desired.

Figure 6:
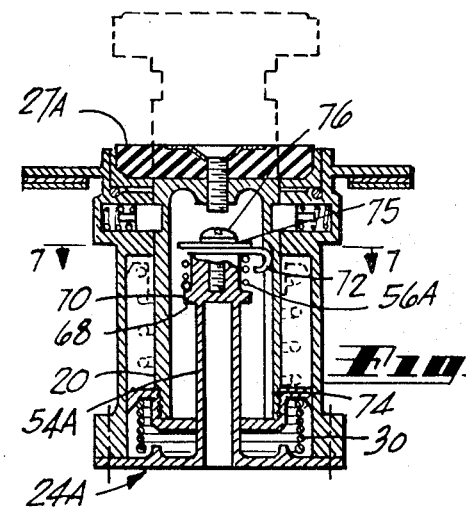
FIG. 6 is a sectional view in elevation of an alternate embodiment.
Figure 7:
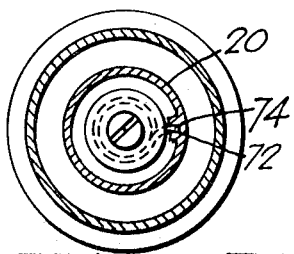
FIG. 7 is a plan view taken along the line 7—7 in FIG. 6.

FIGS. 6 and 7 show an alternate form of structure for keeping the post 20 in rotational alignment. For convenience, the housing post and related structure are similar to that just described and further description in this embodiment is not thought to be necessary. The base 24A, however, differs from the earlier form of base in that it has a post 54A centrally mounted instead of offset, and it is adapted to receive a helical torsion spring 56A wound around the top portion 68 of the post 54A. This helically wound spring has an end 70 non- rotatably affixed to the post 54A and has a free end 72 protruding outwardly into the groove 74 formed on the inner surface of post 20. This spring forms the same function as the torsion spring 50 discussed earlier by rotationally aligning the post 20 in both its extended and retracted positions. For convenience in assembly, the helical spring 56A fits over the top of post 54A and a washer 75 is mounted thereover to prevent the top coil of the spring 56A from riding over the top and causing a malfunction. This washer 75 is held in place by a screw 76 threadedly mounted to the top 68 of the post. It has been found that this type of torsion spring permits a greater degree of post rotation than the leaf spring 50 in the original embodiment.

The retractable post just described has a principle use in the restraint of a service cart in an aisle area of an aircraft although, of course, many other uses will become apparent. The undersurface of the serving cart has a latching device which firmly attaches the cart to the post and a latch release is also provided on the cart to detach it from the post. These features of the cart are not part of the present invention but Lare used in association therewith. To extend the post from its retracted position, the stewardess places her foot on the rubber surface of the post and rotates it approximately 45° and then removes her foot. The post will move to its extended position which, in the present embodiment, is only a matter of one or two inches, and the leaf spring in the post assembly rotates back to its original rotation alignment. The service cart can now be rolled into position over the post and a latching device will lock onto the post. After removal of the cart, the hostess can retract the post by simply stepping on it and returning it to floor level where it will be retained until needed again. The principle advantage of the post just described is that it is completely self-contained and can be easily operated by a stewardess without bending over or getting involved with a dirt covered handle on the floor. Other devices that could be used eliminate the need for stooping and to manually pull up on a floor handle. However, this would involve external actuating equipment utilizing flexible cables or electrical connection to operate valves or solenoids, all of which adds considerable weight and complexity to the system. The self-contained unit just described can easily be installed or replaced by simply removing the bolts to which it is connected to the cabin floor. Thus, in the event of any malfunction, the unit can be taken out and a new one reinstalled without excessive delay.

Having thus described an illustrative embodiment encompassing the principles of this invention, other embodiments will readily occur to those skilled in the art and it is to be understood that these variations are to be considered as part of the present invention.

I claim:

1. A retractable post apparatus for vertical movement of a post between a retracted position within a housing and an extended position exteriorly of the housing, said apparatus comprising:

a housing having an annular opening in the top thereof;

a cylindrical post rotationally and vertically movable within said opening;

bias means continually urging said cylindrical post vertically out of said opening;

latching means selectively restraining said post within said housing in retracted position;

said latching means comprising retaining pins radially extendible in receptacles in said housing communicating with said annular opening, said post having cavities therein engageable with said pins when said post is in retracted position;

said post being rotatable to move said cavities out of vertical alignment with said pins; and rotational alignment means for urging the rotating of said post to place said cavities into vertical alignment with said pins.

2. A retractable post apparatus as in claim 1 wherein said retaining pins are biased inwardly against said post by compression springs.

3. A retractable post apparatus as set forth in claim 1 wherein said rotational alignment means includes a vertical groove in said post and a spring attached to said housing, said spring having a free end in said groove, said groove passing over said spring end upon vertical movement of said post, said spring resiliently maintaining rotational alignment between said cavities and said pins.

4. A retractable post apparatus as set forth in claim 1, said cavities having cam surfaces for removing said pins therefrom upon rotation of said post.

* * * * *